United States Patent
Li et al.

(10) Patent No.: US 11,846,849 B2
(45) Date of Patent: Dec. 19, 2023

(54) CURVED DISPLAY PANEL AND DISPLAY DEVICE

(71) Applicants: MIANYANG HKC OPTOELECTRONICS TECHNOLOGY CO., LTD, Mianyang (CN); HKC CORPORATION LIMITED, Shenzhen (CN)

(72) Inventors: Hui Li, Mianyang (CN); Rongrong Li, Mianyang (CN)

(73) Assignees: MIANYANG HKC OPTOELECTRONICS TECHNOLOGY CO., LTD, Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/075,335

(22) Filed: Dec. 5, 2022

(65) Prior Publication Data

US 2023/0280617 A1 Sep. 7, 2023

(30) Foreign Application Priority Data

Mar. 3, 2022 (CN) .......................... 202210208156.3

(51) Int. Cl.
*G02F 1/1339* (2006.01)

(52) U.S. Cl.
CPC ................................. *G02F 1/1339* (2013.01)

(58) Field of Classification Search
CPC .............. G02F 1/1339; G02F 1/13392; G02F 1/13394; G02F 1/13396; G02F 1/13398
USPC .................................................. 349/155, 156
See application file for complete search history.

(56) References Cited

U.S. PATENT DOCUMENTS

| | | | |
|---|---|---|---|
| 2017/0192278 A1* | 7/2017 | Jia ........................ | G02F 1/13394 |
| 2018/0136504 A1* | 5/2018 | Wang .................... | G02F 1/1339 |
| 2019/0033628 A1* | 1/2019 | Kawata ................ | G02F 1/13394 |
| 2020/0073165 A1* | 3/2020 | Zhang ................... | G02F 1/1368 |

* cited by examiner

*Primary Examiner* — Edward J Glick
*Assistant Examiner* — David Y Chung (57) ABSTRACT

A curved display panel and a display device are disclosed. The curved display panel includes a sealant, a first substrate, a second substrate, and at least two sets of buffer members that are respectively disposed along both sides of the curved display panel in a bending direction and between the sealant and a display region. The buffer members are made of an elastic material, and include a first fixing member arranged between the sealant and the display region and connected to the first substrate, and a second fixing member arranged between the first fixing member and the sealant and connected to the second substrate. Before the curved display panel is bent, one side of the first fixing member abuts one side of the second fixing member. After the curved display panel is bent, the first and the second fixing member are pressed against each other.

11 Claims, 5 Drawing Sheets

CURVED DISPLAY PANEL AND DISPLAY DEVICE

CROSS-REFERENCE TO RELATED APPLICATIONS

This application claims the priority to and benefit of Chinese patent application CN2022102081563, titled "Curved Display Panel and Display Device" and filed Mar. 3, 2023 with China National Intellectual Property Administration, the entire contents of which are incorporated herein by reference.

TECHNICAL FIELD

This application relates to the field of display technology, and more particularly relates to a curved display panel and a display device.

BACKGROUND

The description provided in this section is intended for the mere purpose of providing background information related to the present application but doesn't necessarily constitute prior art.

Curved displays are more and more popular because of their high resolution, high transmittance, wider viewing range and stereoscopic visual effects. However, due to the special shape of the curved display panel, the flat display panel first needs to be bent by a preset angle. During the bending process, a lot of stress will be generated on the film layers inside the display panel and the sealant on both sides. This will easily lead to the risk of falling off of the sealant due to excessive stress on the sealant.

One solution to deal with the falling off of the sealant when the curved display is bent consists in limiting the relative movement between the upper and lower substrates by using the mutual fitting of engaging structures. However, as the bending angle of the curved display screen becomes larger and larger, due to the difference in curvature between the upper and lower substrates, relative movement is an inevitable trend. Limiting the relative movement between the upper and lower substrates will inevitably affect the bending angle of the curved display. The limitation is often not conducive to the realization of large-angle bending.

Therefore, how to prevent the sealant from falling off without restricting the relative movement between the two substrates is particularly important.

SUMMARY

In view of the above, it is therefore a purpose of the present application to provide a curved display panel and a display device, where the sealant can be prevented from falling off without restricting the relative movement between the two substrates.

The present application discloses a curved display panel, including a sealant, a first substrate and a second substrate. The first substrate and the second substrate are aligned and bonded together. The second substrate includes a display region and a non-display region arranged around the display region. The sealant is disposed between the first substrate and the second substrate around the display region, and the sealant is located in the non-display region. The curved display panel further includes at least two sets of buffer members, and the at least two sets of the buffer members are respectively disposed on both sides along the bending direction of the curved display panel between the sealant and the display region. The buffer members are made of an elastic material. The buffer members include a first fixing member and a second fixing member. The first fixing member is arranged between the sealant and the display region, and the first fixing member is connected to the first substrate. The second fixing member is arranged between the first fixing member and the sealant, and the second fixing member is connected to the second substrate. Before the curved display panel is bent, one side of the first fixing member abuts one side of the second fixing member. After the curved display panel is bent, the first fixing member and the second fixing member are pressed against each other.

In some embodiments, before the curved display panel is bent, a height of each of the first fixing member and the second fixing member is less than a thickness of the sealant, and greater than a half of a thickness of the sealant.

In some embodiments, the first fixing member and the second fixing member are both elongated, and are respectively parallel to the two sides of the sealant in the bending direction of the curved display panel. The lengths of the first fixing member and the second fixing member are each less than or equal to a length of the sealant in the bending direction of the curved display panel.

In some embodiments, a side of the first fixing member in contact with the second fixing member includes a groove, and the second fixing member includes a protrusion disposed at a position corresponding to the groove. After one side of the first fixing member is in contact with one side of the second fixing member, the protrusion is embedded in the groove and fixed to the groove.

In some embodiments, before the curved display panel is bent, two respective surfaces of the first fixing member and the second fixing member that are abutting against each other are both inclined surfaces.

In some embodiments, before the curved display panel is bent, an angle of inclination between the inclined surface of the first fixing member and the second substrate lies in the range of 30° to 50°, and an angle of inclination between the inclined surface of the second fixing member and the second substrate lies in the range of 60° to 80°.

In some embodiments, before the curved display panel is bent, two respective surfaces of the first fixing member and the second fixing member abutting each other are curved surfaces.

In some embodiments, there are a plurality of sets of the buffer members, which are respectively arranged at intervals along extending directions of both sides of the sealant in the bending direction of the curved display panel.

In some embodiments, the curved display panel further includes a buffer wall, which is composed of at least one set of the buffer members. Each buffer wall includes at least a first buffer wall and a second buffer wall. The first buffer wall is arranged on a side of the sealant adjacent to the display region, and the second buffer wall is arranged between the first buffer wall and the sealant.

The application further discloses a display device including a backlight module. The display device further includes the above-mentioned curved display panel. The backlight module is arranged on a side of a light incident surface of the curved display panel.

Compared with the solution of restricting the relative movement of the upper and lower substrates by the mutual fitting of the engaging structures, the present application does not restrict the relative movement between the upper and lower substrates, but rather a buffer member is arranged in the curved display panel. The buffer member is composed of two parts, namely the first fixing member and the second fixing member. In particular, in the bending direction of the curved display panel, the first fixing member and the second fixing member are respectively provided on the first substrate and the second substrate at positions close to both sides of the sealant, and the first fixing member and the second fixing member are located on the inner side of the sealant. Before the curved display panel is bent, the first fixing member abuts the second fixing member. After the curved display panel is bent, as the bending angle gradually increases, a relative displacement occurs between the first substrate and the second substrate, and the generated stress is first transmitted to the first fixing member and the second fixing member, so that the first fixing member and the second fixing member are pressed against each other. The interaction force of the first fixing member and the second fixing member can relieve the shear force of the sealant. So it can effectively prevent the sealant from breaking, improve reliability, and prevent the sealant from falling off.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", or the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

Hereinafter this application will be described in further detail with reference to the accompanying drawings and some optional embodiments.

Figure 1:
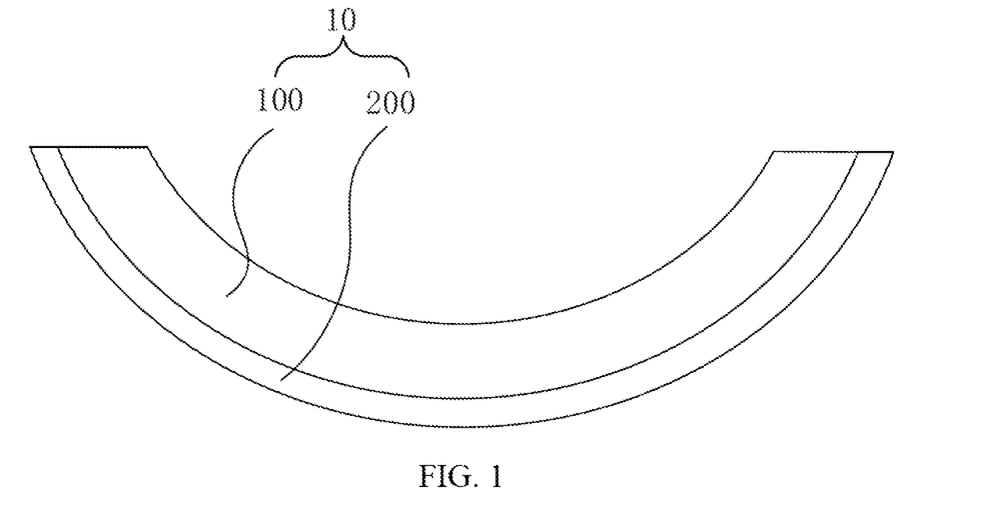
FIG. 1 is a schematic diagram of a display device according to an embodiment of the application.

FIG. 1 is a schematic diagram of a display device according to an embodiment of the application. As shown in FIG. 1, the present application discloses a display device 10 including a backlight module 200. The display device 10 further includes a curved display panel 100. The backlight module 200 is disposed on the side of a light incident surface of the curved display panel 100. The backlight module 200 provides a light source for the curved display panel 100 to ensure normal display of the curved display panel 100.

The curved display panel 100 used in the display device 10 of the present application may be a liquid crystal display panel or a COA display panel, which is not limited herein. When manufacturing a curved display panel, the two substrates of the flat display panel are first bent at a certain angle to form a curved surface. During the bending process of the upper and lower substrates, since the two substrates are bent from the two sides of the flat display panel toward the centerline of the display panel to form a curved display panel, two basic problems may be faced. First, along the bending direction of the curved display panel, the two sides of the display panel do not deform, but the two sides perpendicular to the bending direction of the curved display panel will deform to different degrees with the increase of the bending angle. Second, dislocation in the horizontal direction, that is, in the X-axis direction, is prone to occur between the two substrates due to the different bending curvatures. During the bending deformation of the curved display panel and the dislocation between the substrates, stress will be generated, and if the stress is too large, it is easy to cause the risk of the sealant falling off.

Figure 2:
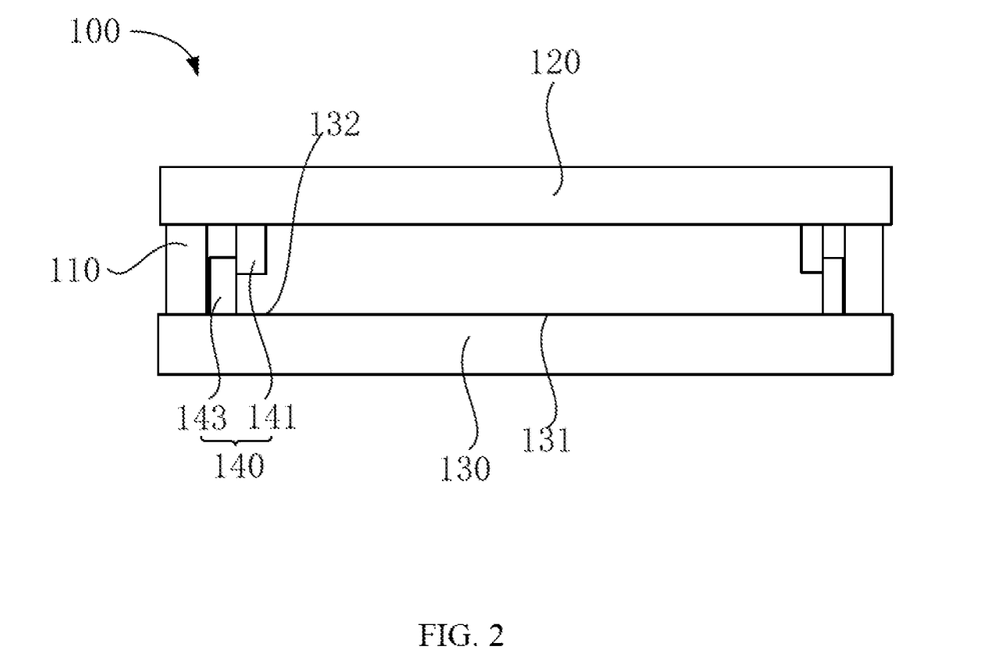
FIG. 2 is a partial schematic diagram of a first embodiment of a curved display panel of the present application before bending.
Figure 3:
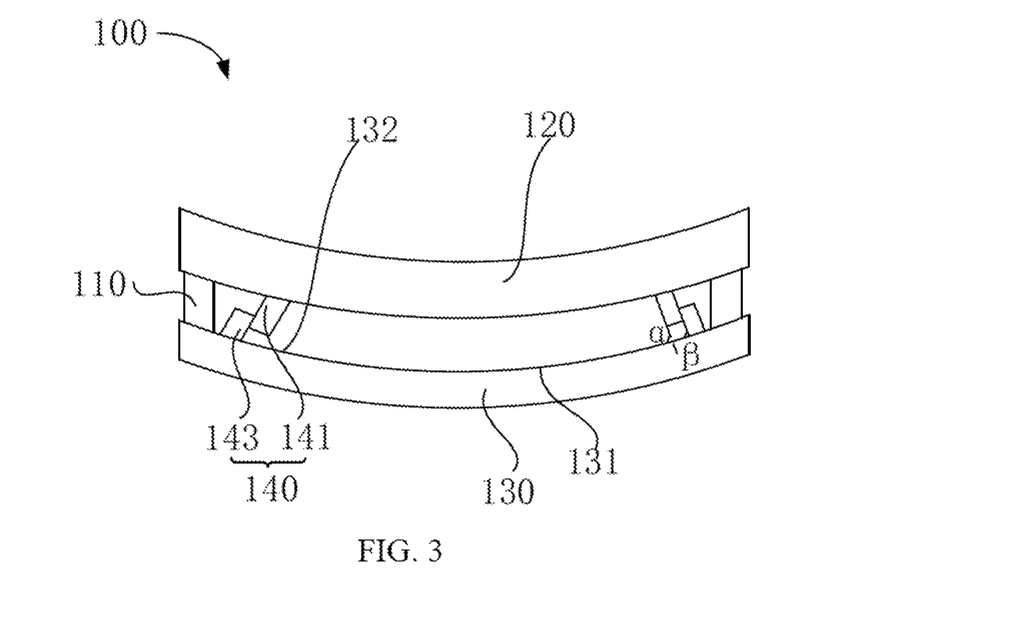
FIG. 3 is a partial schematic diagram of a second embodiment of a curved display panel of the present application after bending.

The display device 10 of the present application improves the curved display panel 100. Without limiting the relative displacement of the two substrates, to prevent the sealant 110 from falling off, the specific improvements of the present application for the curved display panel 100 are as follows:

FIG. 2 is a partial schematic diagram of a first embodiment of the curved display panel of the present application before bending. FIG. 3 is a partial schematic diagram of the first embodiment of the curved display panel of the present application after bending. As shown in FIG. 2 in conjunction with FIG. 3, the present application further discloses a curved display panel 100, including a sealant 110, a first substrate 120 and a second substrate 130. The first substrate 120 and the second substrate 130 are aligned and bonded together. The second substrate 130 includes a display region 131 and a non-display region 132 disposed around the display region 131. The sealant 110 is disposed between the first substrate 120 and the second substrate 130 around the display region 131, and the sealant 110 is located in the non-display region 132. The curved display panel 100 further includes at least two sets of buffer members 140, and the at least two sets of buffer members 140 are disposed between the sealant 110 and the display region 131 along two sides of the curved display panel 100 in the bending direction, respectively. The buffer member 140 is made of an elastic material. The buffer member 140 includes a first fixing member 141 and a second fixing member 143. The first fixing member 141 is disposed between the sealant 110 and the display region 131, and the first fixing member 141 is connected to the first substrate 120. The second fixing member 143 is disposed between the first fixing member 141 and the sealant 110, and the second fixing member 143 is connected to the second substrate 130. Before the curved display panel 100 is bent, one side of the first fixing member 141 abuts one side of the second fixing member 143. After the curved display panel 100 is bent, the first fixing member 141 and the second fixing member 143 are pressed against each other.

In the present application, the bending direction of the curved display panel 100 refers to the direction in which the curved display panel 100 is bent on two sides (usually the shorter sides of the curved display panel) that do not deform during bending.

This application does not limit the relative movement between the upper and lower substrates. Rather, the buffer members 140 are arranged in the curved display panel 100, where one set of buffer members 140 is composed of two parts, namely the first fixing member 141 and the second fixing member 143. In the bending direction of the curved display panel 100, a first fixing member 141 and a second fixing member 143 are respectively arranged on the first substrate 120 and the second substrate 130 at positions adjacent to both sides of the sealant 110, and the first fixing member 141 and the second fixing member 143 are located to an inner side of the sealant 110. Before the curved display panel 100 is bent, the first fixing member 141 is in contact with the second fixing member 143. After the curved display panel 100 is bent, relative displacement occurs between the first substrate 120 and the second substrate 130 as the bending angle gradually increases, and the generated stress is first transmitted to the first fixing member 141 and the second fixing member 143 up, so that the first fixing member 141 and the second fixing member 143 are pressed against each other. The interaction force between the first fixing member 141 and the second fixing member 143 can relieve the shear force on the sealant 110. Thus, the cracking of the sealant 110 can be effectively prevented, the reliability can be improved, and the sealant 110 can be prevented from falling off.

Since the buffer members 140 are made of an elastic material, such as rubber or resin, they are easier to deform after the first fixing member 141 and the second fixing member 143 are pressed against each other, and the relative movement between the first substrate 120 and the second substrate 130 is prevented from being restricted by the deformation. Furthermore, the deformation caused by the extrusion between the first fixing member 141 and the second fixing member 143 can also be used to release the stress, so as to avoid damage during the mutual compression of the first fixing member 141 and the second fixing member 143.

Further, in order to enable the first fixing member 141 and the second fixing member 143 to be in better contact during the bending process of the curved display panel 100 to create a shear force generated by squeezing, the heights of the first fixing member 141 and the second fixing member 143 are designed as follows. Before the curved display panel 100 is bent, that is, when there is no squeezing between the first fixing member 141 and the second fixing member 143, the heights of the first fixing member 141 and the second fixing member 143 in the natural state are both smaller than the thickness of the sealant 110 and greater than half of the thickness of the sealant 110.

After the first substrate 120 and the second substrate 130 are assembled, one side of the first fixing member 141 and one side of the second fixing member 143 are more likely to abut each other. When the curved display panel 100 is bent, as the bending angle gradually increases, a relative displacement occurs between the first substrate 120 and the second substrate 130, and the generated stress is first transmitted to the first fixing member 141 and the second fixing member 143. When the second substrate 130 is located under the first substrate 120, the first fixing member 141 disposed on the first substrate 120 will bend outward under the action of stress, and the second fixing member 143 disposed on the second substrate 130 will bend inwards under the action of stress, so that the sides of the first fixing member 141 and the second fixing member 143 that are in contact with each other are compressed relative to each other. The mutual squeezing of the first fixing member 141 and the second fixing member 143 can relieve the shear force on the sealant 110. Thus, the cracking of the sealant 110 can be effectively prevented, the reliability can be improved, and the sealant 110 can be prevented from falling off.

Figure 4:
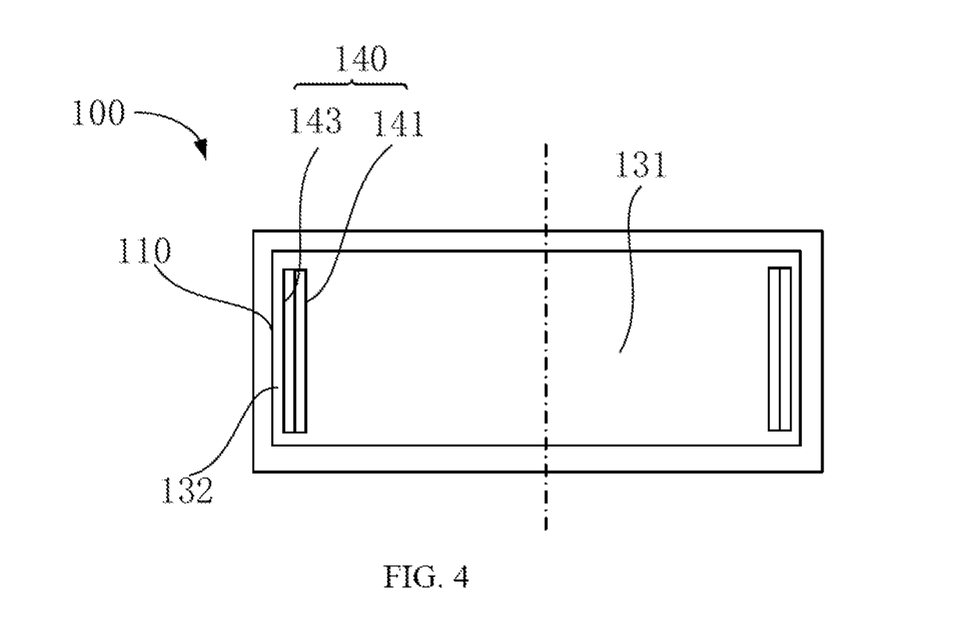
FIG. 4 is a top view of the first embodiment of the curved display panel of the present application before bending.

FIG. 4 is a top view of the first embodiment of the curved display panel of the present application before bending. The first fixing member 141 and the second fixing member 143 are both elongated. The first fixing member 141 and the second fixing member 143 are respectively parallel to both sides of the sealant 110 in the bending direction of the curved display panel 100. Furthermore, the lengths of the first fixing member 141 and the second fixing member 143 are both less than or equal to the length of the sealant 110 in the bending direction of the curved display panel 100.

When the curved display panel 100 is bent, the first fixing member 141 moves away from the center line of the first substrate 120 along with the first substrate 120, and the second fixing member 143 moves with the second substrate 130 toward the centerline of the second substrate 130, where the two moving directions are opposite to just form compression. During the compression process of the elongated first fixing member 141 and the second fixing member 143, due to the large contact area of each other, they are not easy to separate from each other, and a stable interaction force can be formed to suppress the shear force on the sealant 110. Furthermore, when the lengths of the elongated first fixing member 141 and second fixing member 143 are both equal to the length of the sealant 110 in the bending direction of the curved display panel 100, the buffering range of the shearing force on the sealant 110 can be increased, the restraining effect on the sealant 110 from the shearing force can be enhanced, and the risk of the sealant 110 falling off or breaking due to a large shear force when the curved display panel 100 is bent is avoided, and the reliability of the curved display panel 100 is improved.

Since the present application suppresses the shear force acted on the sealant 110 from the deformation of the first substrate 120 and the second substrate 130 when the curved display panel 100 is bent by means of the acting force that is created by the mutual compression of the first fixing member 142 and the second fixing member 143 after the curved display panel 100 is bent, the shear force received by the sealant 110 is buffered, and the sealant is prevented from falling off or breaking when the curved display panel 100 is bent. Therefore, during the bending process of the curved display panel 100, stable contact can be formed between the first fixing member 141 and the second fixing member 143. During the bending process of the curved display panel 100, it is particularly important that the first fixing member 141 and the second fixing member 143 do not fall off and keep pressing each other all the time and generate a pressing or squeezing force.

In addition, aiming at the above-mentioned problem of separation between the first fixing member 141 and the second fixing member 143 when the curved display panel 100 is bent, the present application further specifically improves the structures of the first fixing member 141 and the second fixing member 143 and provides the following three implementations.

Figure 5:
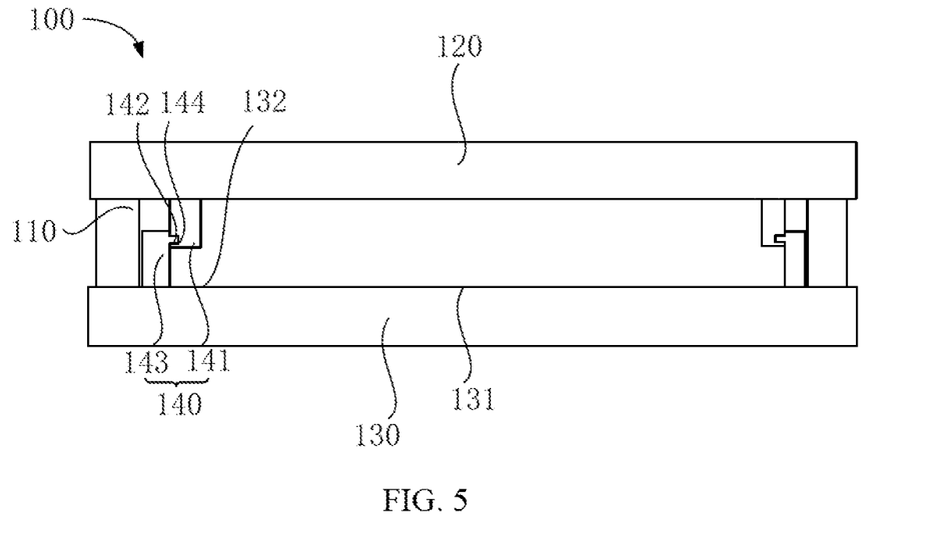
FIG. 5 is a partial schematic diagram of the second embodiment of the curved display panel of the present application before bending.
Figure 6:
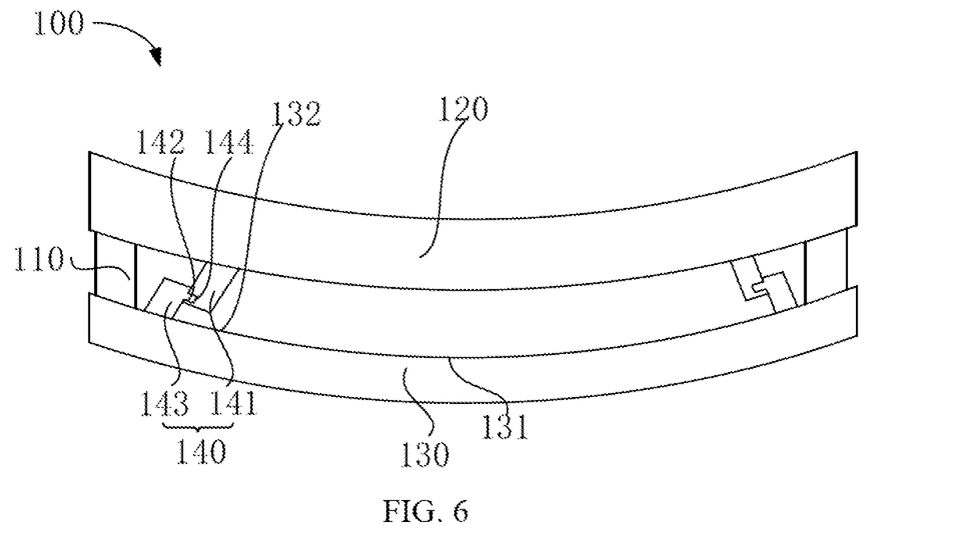
FIG. 6 is a partial schematic view of the second embodiment of the curved display panel of the present application after bending

FIG. 5 is a schematic diagram of a second embodiment of the curved display panel of the present application before bending. FIG. 6 is a schematic diagram of the second embodiment of the curved display panel of the present application after bending. As shown in FIGS. 5 and 6, the embodiment shown in FIG. 5 is an improvement based on FIG. 2. A groove 142 is defined in the side of the first fixing member 141 in contact with the second fixing member 143. The second fixing member 143 is provided with a protrusion 144 at a position corresponding to the groove 142. After one side of the first fixing member 141 is in contact with one side of the second fixing member 143, the protrusion 144 is inserted into the groove 142 and fixed with the groove 142.

In this embodiment, before the curved display panel 100 is bent, the protrusion 144 of the second fixing member 143 is snapped into the groove 142 of the first fixing member 141, so that the first fixing member 141 and the second fixing member 143 form a stable connection. When the curved display panel 100 is bent, the first fixing member 141 moves away from the center line of the first substrate 120 along with the first substrate 120, and the second fixing member 143 moves toward the centerline of the second substrate 130 along with the second substrate 130. That is, they move in two opposite directions to create compression. The protrusion 144 of the second fixing member 143 is not easy to fall off from the groove 142 of the first fixing member 141, so that even if the first fixing member 141 and the second fixing member 143 are deformed in the process of pressing each other, it is also not easy to cause separation between the first fixing member 141 and the second fixing member 143. Thus, a stable pressing force will be generated between the first fixing member 141 and the second fixing member 143 to suppress the shearing force on the sealant 110 caused by the bending of the curved display panel 100 and so the sealant 110 is prevented from falling off or breaking due to the shearing force.

Figure 7:
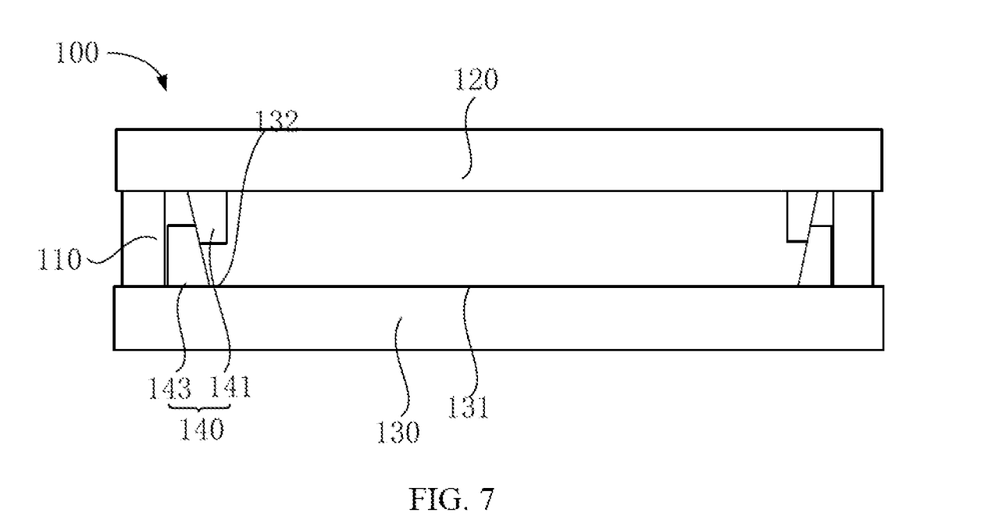
FIG. 7 is a partial schematic diagram of the third embodiment of the curved display panel of the present application before bending

FIG. 7 is a schematic diagram of a third embodiment of the curved display panel of the present application before bending. As shown in FIG. 7, before the curved display panel 100 is bent, the two surfaces abutting against each other between the first fixing member 141 and the second fixing member 143 are both inclined surfaces.

In this embodiment, before the curved display panel 100 is bent, the two surfaces of the first fixing member 141 and the second fixing member 143 in contact with each other are both inclined surfaces. In the natural state, the two surfaces of the first fixing member 141 and the second fixing member 143 that are in contact with each other can fit better. When the curved display panel 100 starts to bend, the two inclined surfaces of the first fixing member 141 and the second fixing member 143 will slide relative to each other first, so that the normal bending of the curved display panel 100 will not be affected. During the bending process of the curved display panel 100, there is no obvious "jerkiness" due to obvious resistance, which can ensure the smooth bending and forming of the curved display panel 100. However, as the bending angle of the curved display panel 100 gradually increases, the two mutually contacting inclined surfaces of the first fixing member 141 and the second fixing member 143 will be further squeezed, resulting in a pressing force. Thus, even if the first fixing member 141 and the second fixing member 143 are deformed during the squeezing process, the two inclined surfaces in contact with each other will be firmly attached to each other, avoiding the situation where the disappearance of the force caused by the falling off of the first fixing member 141 and the second fixing member 143 cannot effectively restrain the shear force on the sealant 110. This further prevents the sealant 110 from falling off or breaking during the bending process of the curved display panel 100, thereby improving the quality and reliability of the curved display panel 100.

In addition, in order to make the inclined surface of the first fixing member 141 and the inclined surface of the second fixing member 143 not easily fall off when they are in contact with each other and squeezed during the bending process of the curved display panel 100, the angle of inclination from each of the inclined surface of the first fixing member 141 and the inclined surface of the second fixing member 143 to the second substrate 130 before the curved display panel 100 is bent in the present application is defined as follows.

As shown in FIG. 7, before the curved display panel is bent, the angle of inclination between the inclined surface of the first fixing member 141 and the second substrate 130 ranges from 30° to 50°, and the angle of inclination between the inclined surface of the second fixing member 143 and the second substrate 130 ranges from 60° to 80°. This design can effectively avoid the situation where when the curved display panel 100 is bent, as the bending angle becomes larger, the angle of inclination of each of the first fixing member 141 and the second fixing member 143 relative to the second substrate 130 also becomes larger and larger. As a result, the first fixing member 141 and the second fixing member 143 are separated, and an effective interaction force cannot be formed to restrain the shear force of the sealant 110. The stability of the force formed between the first fixing member 141 and the second fixing member 143 is thus further improved, so that the buffer member 140 can better restrain the shear force on the sealant 110, so that the risk of falling off or breaking of the sealant 110 caused by the shear force is effectively reduced, and the reliability of the curved display panel 100 is improved.

Figure 8:
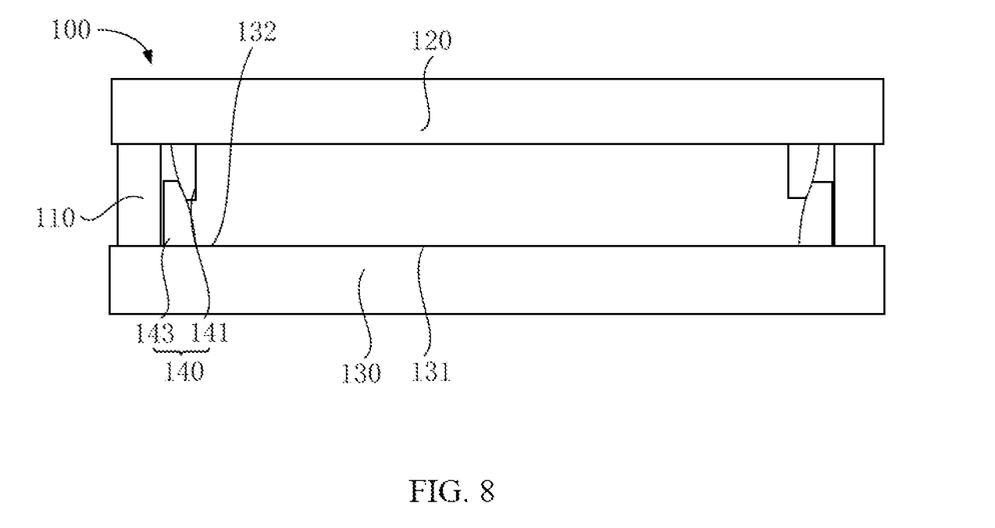
FIG. 8 is a partial schematic diagram of a fourth embodiment of the curved display panel of the present application before bending

FIG. 8 is a schematic diagram of a fourth embodiment of the curved display panel according to the present application before bending. As shown in FIG. 8, before the curved display panel 100 is bent, the two surfaces abutting against each other between the first fixing member 141 and the second fixing member 143 are both curved surfaces.

In this embodiment, the difference from the previous embodiment is that before the curved display panel 100 is bent, the two surfaces of the first fixing member 141 and the second fixing member 143 abutting each other are both curved surfaces in a natural state. By adopting a curved surface design for the abutting surfaces of the first fixing member 141 and the second fixing member 143, during the bending process of the curved display panel 100, the two curved surfaces in contact with each other will be squeezed first. The curved surfaces can be used to disperse the squeezing force, so as to avoid the situation where when the first substrate 120 and the second substrate 130 move relative to each other as the bending angle of the curved display panel 100 increases gradually, the interaction force between the first fixing member 141 and the second fixing member 143 presses the first substrate 120 and the second substrate 130, causing the first substrate 120 and the second substrate 130 to be broken or partially uneven.

Since the first fixing member 141 and the second fixing member 143 are both made of an elastic material, the first fixing member 141 and the second fixing member 143 will be deformed when they are pressed against each other. During the deformation process, the two curved surfaces will move along an arc line, creating an "biting" like effect, so that the first fixing member 141 and the second fixing member 143 are not easy to fall off, and a stable force can be generated during the compression process to restrain the shear force on the sealant 110, which further prevents the sealant 110 from falling off or breaking during the bending process of the curved display panel 100, thereby improving the quality and reliability of the curved display panel 100.

Figure 9:
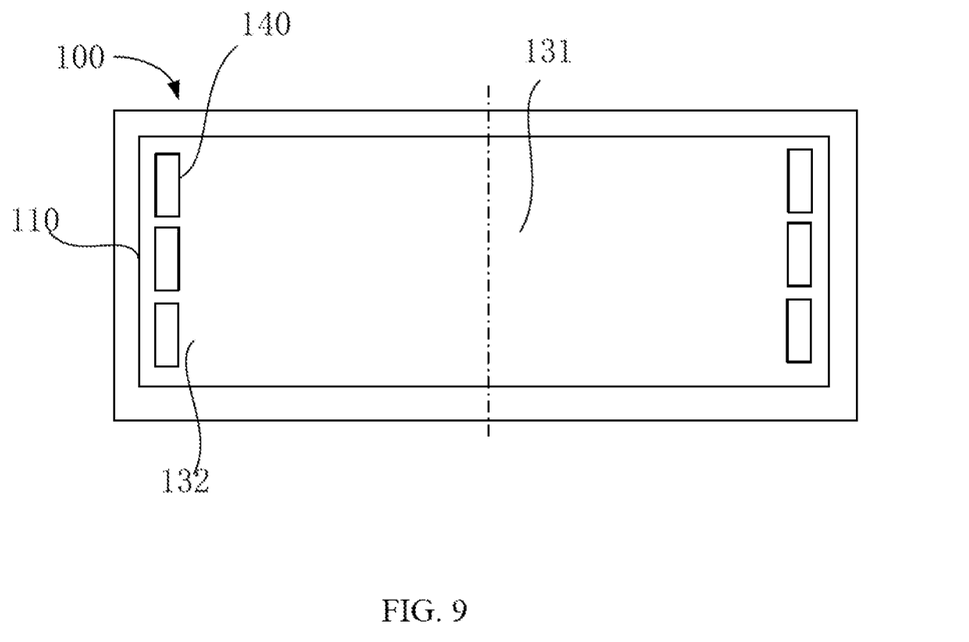
FIG. 9 is a top view of a fifth embodiment of the curved display panel of the present application.

FIG. 9 is a top view of a fifth embodiment of the curved display panel of the present application. As shown in FIG. 9, there are a plurality of buffer members 140, and the plurality of buffer members 140 are respectively arranged at intervals along the extending direction of both sides of the sealant 110 in the bending direction of the curved display panel 100.

In this embodiment, a plurality of buffer members 140 are arranged on both sides of the sealant 110 at intervals, and are arranged along the extending directions of two sides of the sealant 110, so that the buffer range for the shear force generated in the direction of the sealant 110 when the curved display panel 100 is bent can be increased. When the curved display panel 100 begins to bend, the deformation of the first substrate 120 and the second substrate 130 will generate shearing force on the sealant 110. This shear force may affect the sealant 110 from different directions. Therefore, the shearing force transmitted to the sealant 110 in different directions can be effectively relieved by the plurality of buffer members 140 arranged at intervals. The shear force on the sealant 110 is suppressed by the interaction force between the first fixing member 141 and the second fixing member 143 of the buffer member 140, so that the risk of the sealant 110 falling off or breaking when the sealant 110 is subjected to shearing force when the curved display panel 100 is bent is avoided, and the reliability of the product and the quality of the curved display panel 100 are improved.

Since the first fixing member 141 and the second fixing member 143 in the buffer member 140 will be pressed against each other, a pressing force will be generated, and the pressing force will act on the first substrate 120 and the second substrate 130, the plurality of buffer members 140 can also be evenly arranged, so that when the curved display panel 100 is bent, the force from the buffer members 140 when the first substrate 120 and the second substrate 130 are deformed is more uniform, and the first substrate 120 and the second substrate 130 can be effectively prevented from being broken during bending deformation, or the problem of local unevenness caused by inconsistent bending degrees can also be effectively avoided. This improves the structural stability and product quality of the curved display.

Figure 10:
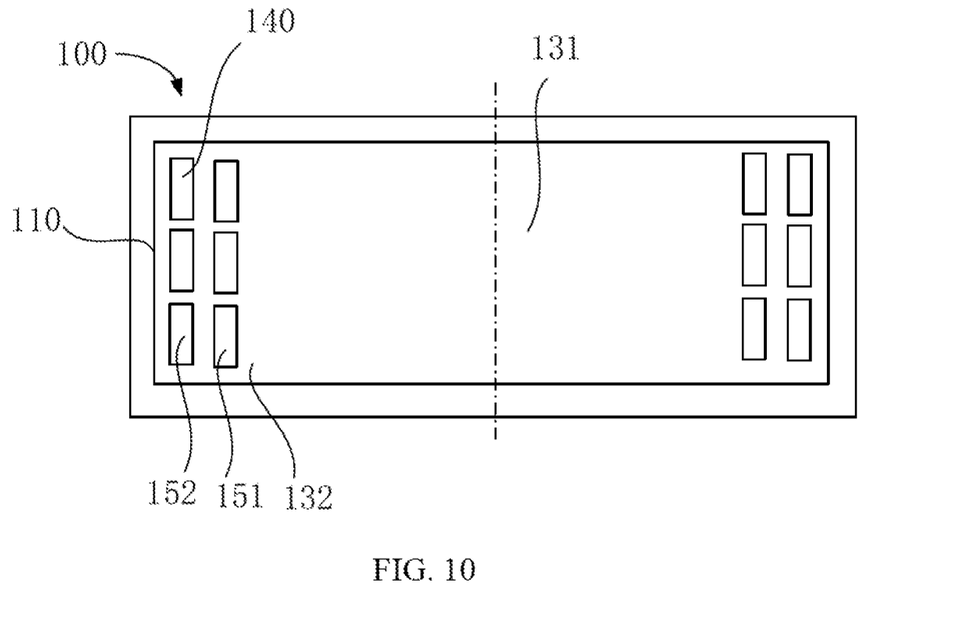
FIG. 10 is a top view of a sixth embodiment of the curved display panel of the present application.

FIG. 10 is a top view of a sixth embodiment of the curved display panel of the present application. As shown in FIG. 10, the curved display panel 100 further includes a buffer wall 150. The buffer wall 150 consists of at least one buffer member 140. The buffer wall 150 includes at least a first buffer wall 151 and a second buffer wall 152. The first buffer wall 151 is disposed on the side of the sealant 110 adjacent to the display region 131. The second buffer wall 152 is disposed between the first buffer wall 151 and the sealant 110.

The difference between this embodiment and the previous embodiment is that at least one buffer member 140 is arranged to form a buffer wall 150 in this embodiment. For example, the buffer wall 150 may be formed by combining two buffer members 140. Furthermore, multiple rows of buffer walls 150 may be arranged between the display region 131 and the sealant 110, that is, at least a first buffer wall 151 and a second buffer wall 152 are arranged. When the curved display screen starts to bend, the stress on the first substrate 120 and the second substrate 130 will be first transmitted from the middle of the curved display panel 100 to the first buffer wall 151 closer to the display region 131, and accordingly the buffer member(s) 140 of the first buffer wall 151 generates an interaction force, so that a first buffering of the shear force of the sealant 110 is created by the buffering member(s) 140 of the first buffering wall 151. When the shear force formed by the bending of the curved display panel 100 passes through the first buffer wall 151 and then weakens and is transmitted to the second buffer wall 152, the shear force generated by the buffer member(s) 140 of the second buffer wall 152 will be buffered for the second time by the interaction force generated by the buffer member(s) 140 of the second buffer wall 152. In this way, in the process of the shearing force being transmitted to the sealant 110, a multi-stage buffer of the shearing force is created, which effectively reduces the risk of the sealant 110 falling off due to excessive shearing force on the sealant 110 when the curved display panel 100 is bent. Meanwhile, the sealant 110 can be effectively prevented from being broken.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A curved display panel, comprising a sealant, a first substrate, and a second substrate; wherein the first substrate and the second substrate are aligned and bonded together; wherein the second substrate comprises a display region and a non-display region disposed around the display region; wherein the sealant is disposed between the first substrate and the second substrate and around the display region, and is disposed in the non-display region;

wherein the curved display panel further comprises at least two sets of buffer members, which are respectively disposed on two sides of the curved display panel along the bending direction and disposed between the sealant and the display region; wherein the buffer members are made of an elastic material, and comprise a first fixing member and a second fixing member; wherein the first fixing member is arranged between the sealant and the display region, and is connected to the first substrate; wherein the second fixing member is arranged between the first fixing member and the sealant, and is connected to the second substrate;

wherein before the curved display panel is bent, one side of the first fixing member abuts one side of the second fixing member; and wherein after the curved display panel is bent, the first fixing member and the second fixing member are pressed against each other;

wherein before the curved display panel is bent, two respective surfaces of the first fixing member and the second fixing member abutting each other are curved surfaces.

2. The curved display panel of claim 1, wherein before the curved display panel is bent, a height of each of the first fixing member and the second fixing member is less than a thickness of the sealant and greater than a half of the thickness of the sealant.

3. The curved display panel of claim 2, wherein the first fixing member and the second fixing member are both elongated and are respectively parallel to the two sides of the sealant in the bending direction of the curved display panel; and wherein lengths of the first fixing member and the second fixing member are each less than or equal to a length of the sealant in the bending direction of the curved display panel.

4. The curved display panel of claim 3, wherein when the curved display panel is bent, the first fixing member moves away from a center line of the first substrate along with the first substrate, the second fixing member moves toward a centerline of the second substrate along with the second substrate.

5. The curved display panel of claim 1, wherein the first fixing member and the second fixing member are both made of an elastic material.

6. The curved display panel of claim 1, wherein the buffer members are made of rubber or resin.

7. The curved display panel of claim 1, wherein there are arranged a plurality of sets of the buffer members, which are respectively arranged at intervals along extending directions of both sides of the sealant in the bending direction of the curved display panel.

8. The curved display panel of claim 7, wherein the buffer members are evenly arranged.

9. The curved display panel of claim 7, wherein the curved display panel further comprises a buffer wall, which is composed of at least one set of the buffer members, wherein each buffer wall comprises at least a first buffer wall and a second buffer wall, wherein the first buffer wall is arranged on a side of the sealant adjacent to the display region, and the second buffer wall is arranged between the first buffer wall and the sealant.

10. A display device comprising a backlight module and a curved display panel, wherein the backlight module is arranged on a side of a light incident surface of the curved display panel, wherein the curved display panel comprises a sealant, a first substrate, and a second substrate; wherein the first substrate and the second substrate are aligned and bonded together; wherein the second substrate comprises a display region and a non-display region disposed around the display region; wherein the sealant is disposed between the first substrate and the second substrate and around the display region, and is disposed in the non-display region;

wherein the curved display panel further comprises at least two sets of buffer members, which are respectively disposed on two sides of the curved display panel along the bending direction and disposed between the sealant and the display region; wherein the buffer members are made of an elastic material, and comprise a first fixing member and a second fixing member; wherein the first fixing member is arranged between the sealant and the display region, and is connected to the first substrate; wherein the second fixing member is arranged between the first fixing member and the sealant, and is connected to the second substrate;

wherein before the curved display panel is bent, one side of the first fixing member abuts one side of the second fixing member; and wherein after the curved display panel is bent, the first fixing member and the second fixing member are pressed against each other;

wherein before the curved display panel is bent, two respective surfaces of the first fixing member and the second fixing member abutting each other are curved surfaces.

11. The display device of claim 10, wherein the curved display panel is a liquid crystal display panel or a COA display panel.

* * * * *